United States Patent
Sanders

(10) Patent No.: US 8,462,584 B2
(45) Date of Patent: Jun. 11, 2013

(54) SONIC BOREHOLE CALIPER AND RELATED METHODS

(75) Inventor: Michael Sanders, Ho Chi Minh (VN)

(73) Assignee: Schlumberger Technology Corporation, Sugar Land, TX (US)

( * ) Notice: Subject to any disclaimer, the term of this patent is extended or adjusted under 35 U.S.C. 154(b) by 907 days.

(21) Appl. No.: 12/210,288

(22) Filed: Sep. 15, 2008

(65) Prior Publication Data

US 2010/0067327 A1    Mar. 18, 2010

(51) Int. Cl.
*G01V 1/44* (2006.01)
*G01V 1/50* (2006.01)

(52) U.S. Cl.
USPC .................. 367/31; 367/28; 367/35; 181/105

(58) Field of Classification Search
USPC ............... 367/31, 35, 25, 28, 29, 30; 181/105
See application file for complete search history.

(56) References Cited

U.S. PATENT DOCUMENTS

| | | | | |
|---|---|---|---|---|
| 4,131,875 A | * | 12/1978 | Ingram | 367/35 |
| 4,701,891 A | * | 10/1987 | Castagna et al. | 367/35 |
| 4,870,627 A | | 9/1989 | Hsu et al. | |
| 4,899,319 A | * | 2/1990 | Medlin | 367/35 |
| 5,485,431 A | * | 1/1996 | Johnson et al. | 367/31 |
| 5,784,333 A | * | 7/1998 | Tang et al. | 367/30 |
| 5,900,733 A | * | 5/1999 | Wu et al. | 324/338 |
| 6,192,316 B1 | | 2/2001 | Hornby | |
| 6,891,777 B2 | | 5/2005 | Pabon et al. | |
| 2005/0065730 A1 | * | 3/2005 | Sinha | 702/7 |
| 2006/0256656 A1 | | 11/2006 | Sinha et al. | |
| 2007/0104027 A1 | | 5/2007 | Brooks | |

OTHER PUBLICATIONS

Kurkjian, A.L., et al., Acoustic sources in fluid-filled boreholes, Geophysics, Jan. 1986, vol. 51, No. 1, pp. 148-163.
Hornby, B.E., et al., Fracture evaluation using reflected Stoneley-wave arrivals, Geophysics, Oct. 1989, vol. 54, No. 10, pp. 1274-1288.
Liu, H.-L., et al., Effects of an elastic membrane on tube waves in permeable formations, The Journal of the Acoustical Society of America, Jun. 1997, vol. 101, Issue 6, pp. 3322-3329.
Tichelaar, B.W., et al., Modeling of borehole Stoneley waves in the presence of skin effects, The Journal of the Acoustical Society of America, Feb. 1999, vol. 105, Issue 2, pp. 601-609.
Arroyo Franco, J.L., et al., Sonic Investigations in and Around the Borehole, Schlumberger Oilfield Review, Spring 2006, vol. 18, No. 1. pp. 14-33.
Bakulin, A., et al., Real-time completion monitoring with acoustic waves, Geophysics, Jan.-Feb. 2008, vol. 73, No. 1, pp. E15-E33.

* cited by examiner

*Primary Examiner* — Ian Lobo
(74) *Attorney, Agent, or Firm* — Jianguang Du; Jody DeStefanis

(57) ABSTRACT

A method and apparatus for determining an effective cross-sectional area of a borehole including one or more sources for generating tube or Stoneley waves in the borehole; receivers for measuring amplitudes of the waves; and means to relate said measured amplitudes to said effective cross-sectional area or related parameters.

11 Claims, 4 Drawing Sheets

SONIC BOREHOLE CALIPER AND RELATED METHODS

FIELD OF THE INVENTION

This invention is generally related to methods and apparatus for measuring the circumference of a borehole and related measurements.

BACKGROUND

In the oil industry, it is usual practice to measure a continuous record of the borehole size so that for example variation in the borehole diameter can be further analyzed. As the result of such analysis, it is possible to detect the presence of fractures in the wall of the borehole or the presence of soft, non-competent rock.

In many instances, a mechanical caliper tool is lowered into the well to make a measurement of the borehole dimensions. For example, Schlumberger's PPC™ tool, also known as the Powered Positioning Caliper, uses four independently powered arms to perform four independent measurements of the distance between the tool body and the wall of the borehole. These measurements allow calculations of the long and short axis diameters of elliptical boreholes.

As documented for example by the co-owned U.S. Pat. No. 6,891,777 to Pabon and Sloan and the prior art cited therein, alternative methods of measuring the borehole diameter make use of acoustic or, more specifically, ultrasonic waves. These methods are mostly based on determining the traveltime between the emission of a short pulse of acoustic signal and the arrival of its echo as reflected from the wall of the borehole. Using knowledge of the speed of sound in the fluid filling the borehole it is possible to covert time measurements into distances.

The known acoustic caliper measurements tend to use ultrasonics in the range of 200 kHz to 2 MHz as a shorter wavelength results in more accurate determination of the arrival times and hence the borehole dimensions. In most tool designs it is further required to keep the pulse length very short to avoid tool movements interfering with the measurements. Thus pulse duration can be in the order of 10 milliseconds or even shorter.

Apart from caliper measurements it is also well known to deploy acoustic logging tools such Schlumberger's DSI™ or Sonic Scanner™ in wells to determine the acoustic properties of the formation surrounding the wells. A state-of-the-art acoustic logging tool such as the Sonic Scanner uses one or more sources and several receivers mounted along the body of the tool. These sources generate wave modes in the borehole. Depending on whether the source is a monopole source or a dipole source, the waves generated are typically either the lowest order axisymmetric wave mode, referred to as Stoneley wave mode, or lowest-order flexural wave modes. The operational bandwidth of sources for acoustic logging is generally in the frequency range of 0.5 to 20 kHz, with the Stoneley mode typically observed in the 0.5 to 5 kHz frequency range.

The waves generated in the borehole by acoustic logging tools cause compressional and shear waves to propagate in the formation, which in turn, radiate energy back into the borehole. The receivers are used to measure the pressure waves of the energy coming back into the borehole, and also those waves which travel directly along the borehole, such as the above-mentioned Stoneley wave. With these measurements, it is possible to determine the velocities or slownesses of the compressional or shear wave and some of the elastic constants or moduli of the rock in the formation surrounding the borehole, as described for example in published U.S. Patent Application Publication No. 2006/0256656 and by J. L. Arroyo Franco et al. in: "Sonic Investigations In and Around the Borehole", Oilfield Review, Spring 2006, pp. 14-33.

The Stoneley wave mode of sonic logging tools is also routinely employed as an indicator for fractures in the formation surrounding the borehole. As detailed for example in co-owned U.S. Pat. No. 4,870,627 to K. Hsu et al. and in the more recent U.S. Pat. No. 6,192,316 to B. Hornby and the references cited therein, fractures in the wall of a borehole cause secondary Stoneley waves, which can be analyzed to determine the fracture location and width.

In published U.S. Patent Application Publication No. 2007/0104027, there is described a method of measuring the depth of a perforation tunnel using an acoustic transmitter and receiver arranged respectively below and above a perforation in the well.

In view of the known art, it is seen as one object of the invention to provide a method and apparatus for determining the cross-sectional area of a borehole and to extend the use of such method and apparatus to facilitate the detection of fractures that intersect the wall of the borehole.

SUMMARY OF INVENTION

According to aspects of the invention, a method and apparatus for determining an effective cross-sectional area of a borehole are provided including sources for generating tube or Stoneley waves in the borehole; receivers for measuring amplitudes of the waves; and means to relate said measured amplitudes to said effective cross-sectional area.

The effective cross-sectional area is a measure of the cross-section of a borehole at a given depth level and can be represented as area or as diameters or radii or as area or as diameters or radii of an effective cross-section which can be for example assumed to be circular or elliptical.

In a preferred embodiment of the invention the cross-sectional area is measured continuously or quasi-continuously along sections of the borehole to provide for example a log of such area measurements. Such measurements can also be referred to as caliper measurement.

A tube or Stoneley wave is a wave with dominant modes which confine the wave energy within the borehole. Its amplitude is defined as any measure which relates to the energy carried by the wave, including the wave amplitudes or power, or power densities etc. A relation suitable for the present invention is any relation which relates in a mathematically deterministic manner the effective cross-sectional area with the amplitude as measured.

The sources are preferably monopole sources, which in a preferred mode of operation are operated to generate tube waves in the frequency range of 0.1 Hz to 20 kHz.

The receivers are preferably pressures sensors such as hydrophones.

In a preferred embodiment of the invention the distance between the source (TX) and the closest receiver (RX) is less than 1 m or even less than 0.5 m. Thus the wave travels preferably a very short distance in the borehole before their amplitude is measured by the receivers. A close TX-RX spacing provides the highest resolution measurement of the cross-sectional area of the borehole. Whilst a 1 ft TX-RX separation is used in the example, closer TX-RX spacing such as 6 inches can also be envisaged.

According to a further aspect of the invention, the above method and apparatus can be combined with a second caliper measurement. The evaluation of both measurements can be used as an indicator for the presence of fractures along the borehole.

It is important that the second caliper is based on a different measuring principle, which could be for example mechanical or ultrasonic methods. For the method to work effectively, these second caliper measurements are essentially not sensitive to fractures.

According to another aspect of the invention, the tube or Stoneley wave as generated by a source (TX) and as registered by a receiver (RX) located at a distance of less than 1 m or even less than 0.5 m from the source is used to determine location and/or depth of a perforation in the well.

Whilst it is preferred that the all of the above elements are part of a tool located during operation in a well, it can be envisaged that part of the processing elements are located during operations on a surface location.

Further details, examples and aspects of the invention will be described below referring to the following drawings.

DETAILED DESCRIPTION

Figure 1:
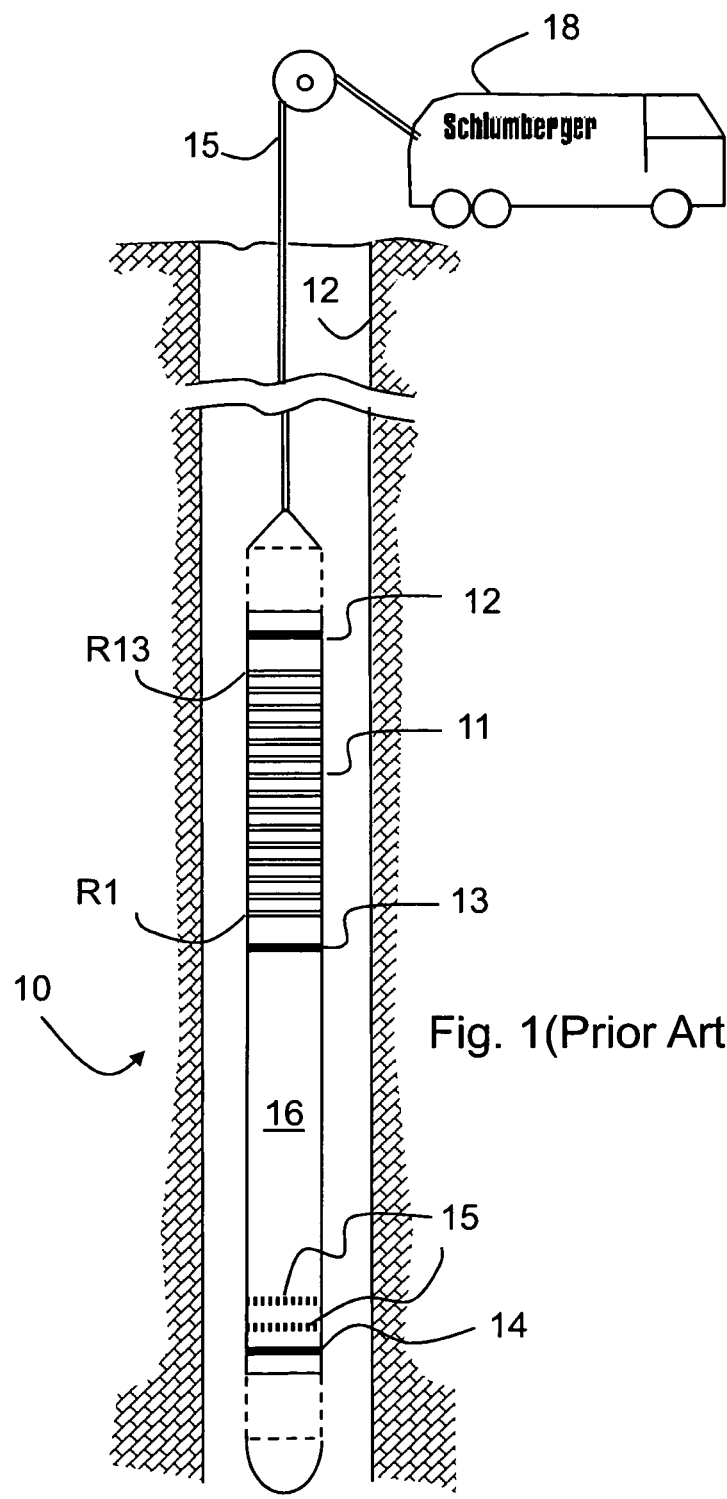
FIG. 1 shows a known logging device which can be adapted for use in an example of the present invention.

A schematic diagram of a commercially available acoustic logging tool is shown in FIG. 1. The tool section 10 of the Sonic Scanner™ of Schlumberger combines a long-spaced transmitter-receiver geometry with a closer-spaced transmitter-receiver geometry in a borehole-compensated arrangement. It includes a 6 ft (1.8 m) section 11 of 13 axial receiver stations each equipped with eight azimuthally distribute hydrophones. An upper monopole transmitter (MU) 12 is located at the top end of the receiver section 11 with a spacing of 1 ft (30 cm) to the nearest receiver station R13. A lower monopole transmitter (MU) 13 is located at the bottom end of the receiver section 11 with a spacing of 1 ft (30 cm) to the nearest receiver station R1.

The long-spaced transmitter section is made up of a far monopole source 14 and two orthogonally oriented dipole transmitters 15 separated from the receiver section 11 by an acoustic isolator 16.

Each of the three piezoelectric monopole sources produces strong pressure pulses giving rise to P-, S- and—at lower frequencies—Stoneley wave modes in the borehole and the surrounding formation.

In the following example, the MU and ML transmitters 12, 13 are triggered with a low frequency Stoneley waveform that is typically in the frequency range of 0.5 to 5 kHz. The waveforms as measured at the 13 receiver stations are shown in FIG. 2.

Figure 2:
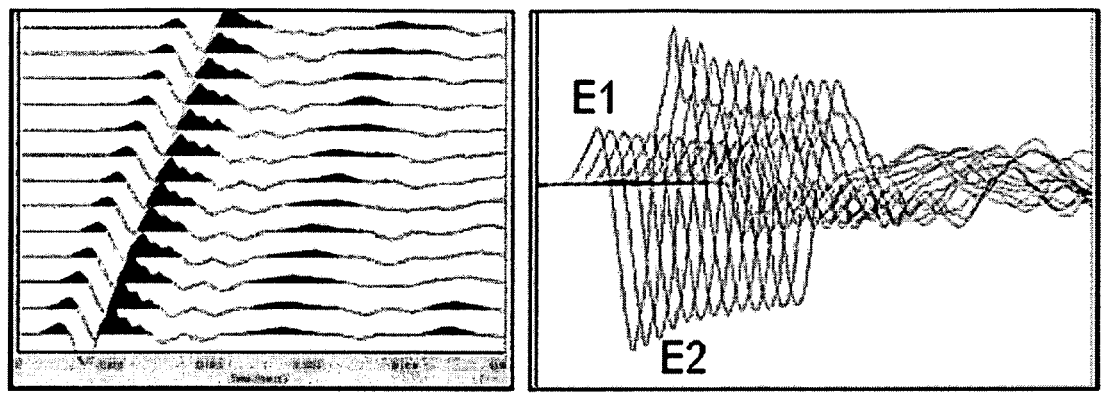
FIGS. 2 and 3 illustrate tube wave measurements in a borehole.

The left plot of FIG. 2 shows the 13 waveforms with the lower waveform having a 1 ft (30 cm) transmitter-receiver (TX-RX) spacing, whilst the upper waveform has a 7 ft (2.10 m) TX-RX spacing. The individual receiver stations are 0.5 ft apart. As shown, the first waveform has a very early arrival time.

The right plot of FIG. 2 is a different presentation of the same data, now plotted with all the traces overlain. A decrease in amplitude along the array can be observed. The E1 and E2 labels denote the first arriving peak and trough of the waveform.

Figure 3:
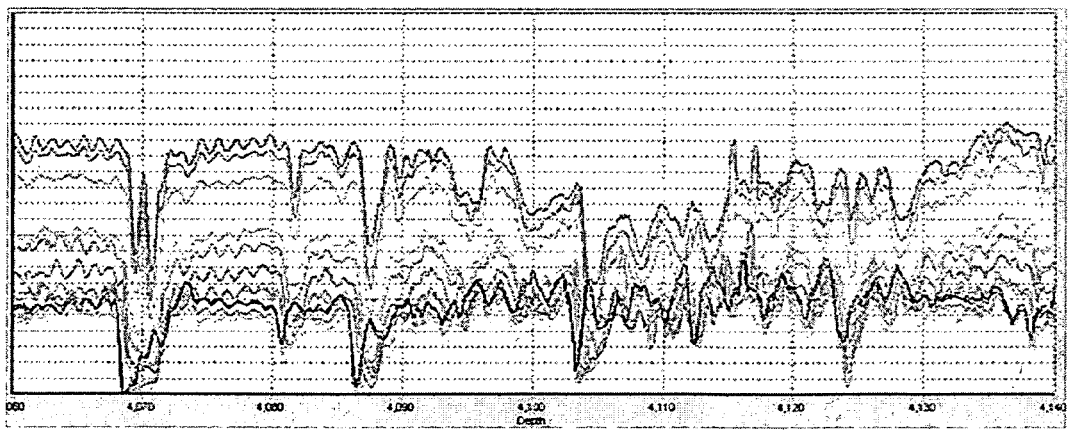

The amplitude of the E1 and E2 events are both measured. The measurements for the E1 event for all 13 receivers are shown in FIG. 3 for a depth interval from 4,060 to 4,140 meters. The attenuation in amplitude can be caused by increases in the borehole radius and by fractures in the formation extending out from the borehole. When applying this data to calculate the caliper in accordance with this example of the invention, the near spaced 1 ft (30 cm) TX-RX spacing measurement (the first curve from the top) is used.

To calculate the caliper, a theoretical low-frequency derivation of the wave caused by a monopole source in a fluid filled tube is used. In the present example the formula as derived by A. L. Kurkjian and S.-K. Chang in: "Acoustic multipole sources in fluid-filled boreholes", Geophysics, Vol. 51, No. 1 (January 1986), pp. 148-163 is applied. It relates the pressure amplitude p of the wave to the time derivative of volume change $dv0/dt$ of the source in the form $$P(t,z) \sim (\rho f^* vT/A) dv0(t-z/vT)/dt \qquad [1]$$

where $\rho f$ denotes the density of the fluid in the borehole, $vT$ the low-frequency asymptotic velocity of the tube wave mode, t the time, z the distance along the tube between source and receiver and A the cross-section of the tube at z.

For a sonic tool z is a constant and in a short section of the borehole the fluid density $\rho f$ and the tube wave velocity $vT$ can be both treated as constant while the volume $v0$ of the source goes through a fixed cycle controlled by a sweep signal for the monopole sources. Hence the remaining variable in equation [1] is the cross-section A of the borehole.

The unknown constants in equation [1] can be determined through direct measurement, theoretical calculation based on measurements, through calibration in, for example, a section of the borehole, in which the diameter is fixed or otherwise known, or through a combination of these methods. In the present example, the velocity $vT$ is measured using traveltime measurements of the Stoneley wave along the body of the tool. The borehole fluid density can be treated as a constant or it can be measured using known logging tools with gamma-ray or neutron based densitometers or similar tools.

For the above described tool, using the 1 ft TX-RX spacing measurement has the advantage of providing the highest resolution measurement of the borehole diameter that can be computed from the Stoneley waveforms recorded.

The signals as obtained by very close TX-RX transmitter spacing are in very good agreement with equation [1], which is derived as a low frequency approximation. However, this equation does not include information on the waveform frequency, and theoretically superior results can be obtained using more sophisticated algorithms. One such algorithm is discussed for example in "Effects of an elastic membrane on tube waves in permeable formations", Liu & Johnson, The Journal of the Acoustic Society of America, June 1997, Vol 101, Issue 6, page 3322-3329.

Based on the above assumptions and measurements and using the E1 and E2 amplitudes from MU and ML as measured by the respective nearest receivers, an averaged borehole cross-sectional area A can be determined. This caliper measurement is referred to herein as Stoneley or Sonic caliper. In an extension of the present invention, the comparison of the Stoneley caliper with other caliper measurements (mechanical, ultrasonic, etc.) can yield further information about the bore hole as described in more details in the following example.

Figure 4A:
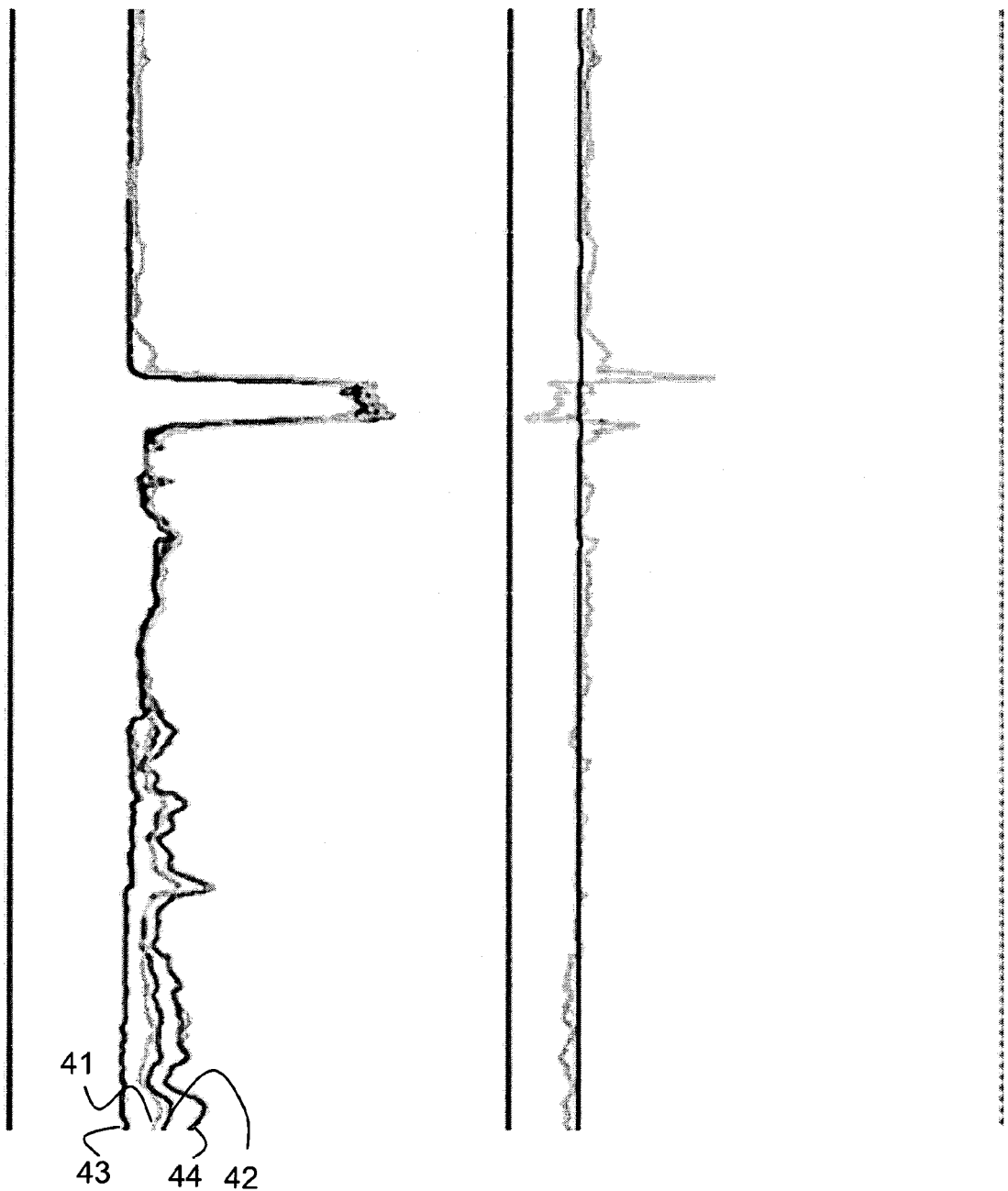
FIGS. 4A and 4B illustrate caliper logs and fracture indicator logs in accordance with an example of the present invention.

Referring first to the left panel of FIG. 4A, the borehole diameter 41 (based on assuming a circular cross-section of the borehole) as calculated on the Stoneley wave is compared with a diameter measurement 42 derived from direct measurement using the PPC mechanical caliper and averaging the diameter measurements of each pair of arms. The measurements by each pair are shown as the two outer curves 43, 44. The deviation between the two measurements 41, 42 is shown in the right panel of FIG. 4A.

Both measurements indicated clearly the location of a casing shoe. The larger hole section directly under the casing shoe is very well identified with the Stoneley caliper measurement. Some small deviation is seen at either end of the enlarged hole section. This deviation is likely the result of in-accuracies in determining an equivalent circular bore hole diameter from the 4 radii measurements of the PPC tool, but may also be attributed to the slightly different resolution of the input caliper curves used in this example.

Figure 4B:
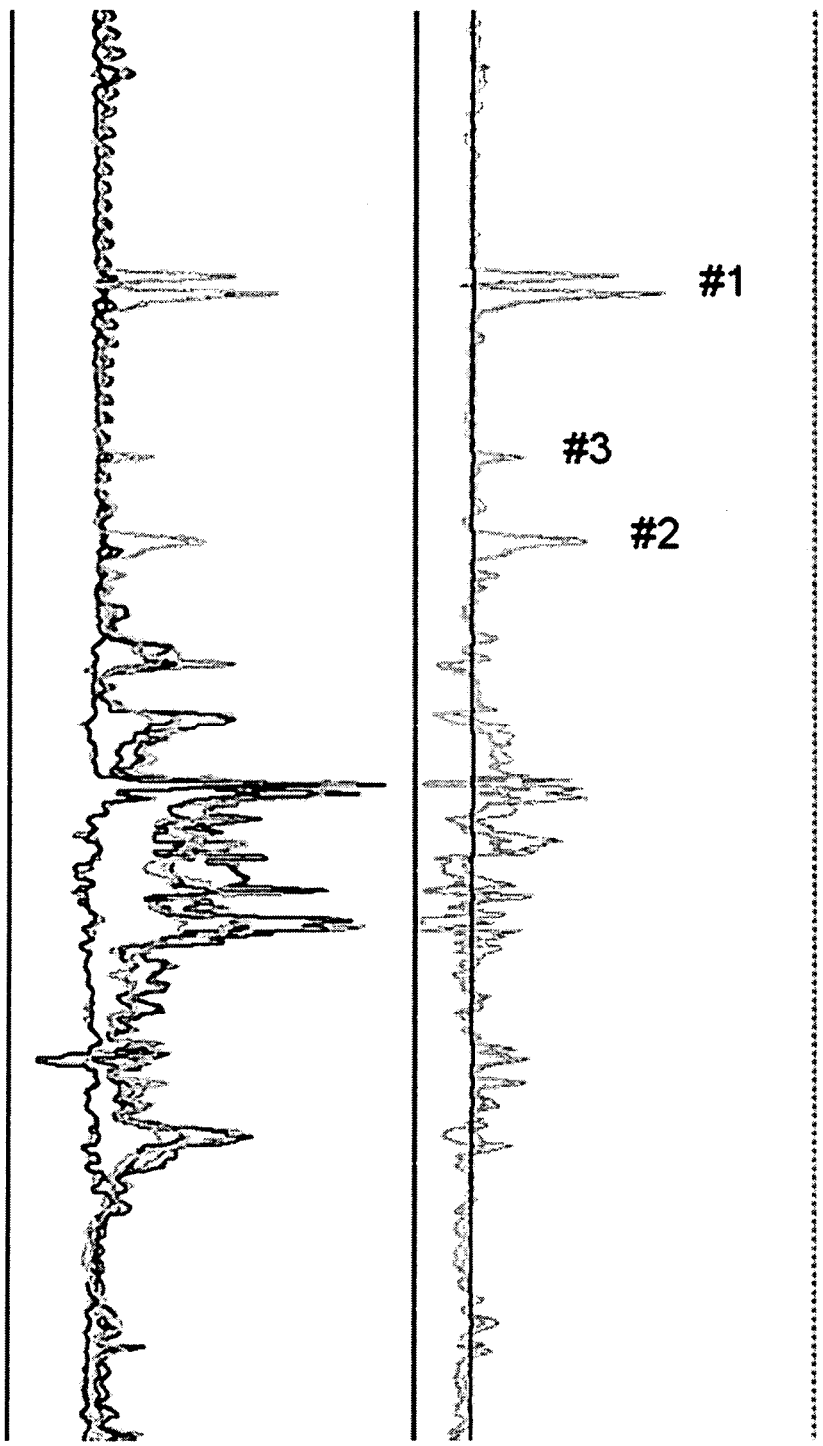

The result of a similar measurement taken at a different section of the borehole is shown in FIG. 4B. In this measurement, the locations of deviations between the Stoneley caliper and the PPC caliper measurement are marked #1, #2 and #3. Such differences are expected to occur for example when the borehole is fractured. The mechanical caliper and its ultrasonic equivalent perform both a direct measurement of the distance between the tool and the wall of the borehole. On the other hand, the caliper measurement based on Stoneley or tube waves as proposed by the present invention provides an integral measurement sensitive to the cross-section of the borehole. Even more accurately, the Stoneley or Sonic caliper method provides an average value of the cross-section along a section of the borehole, the length of which section being approximately equivalent to the distance between the transmitter and receiver.

At the occurrence of an open fracture in the wall of the borehole, caliper and ultrasonic measurements may or may not register the opening depending on whether the line of measurement crosses the fracture. Formation fractures that intersect the borehole are typically in the size range of fractions of an inch and thus too small to be recorded by the PPC caliper tool or a similar device. The PPC caliper tool and similar tools take point measurements every 6 inches along the borehole. In the Stoneley wave measurement, however, whilst in the above example also recorded at discrete 6 inch intervals along the borehole, every waveform traverses the distance between each transmitter and receiver and any fractures in between will contribute to the waveform attenuation. Thus the Stoneley caliper of the present invention is capable of registering an effective increase in the borehole area independent of the tool orientation in the borehole. Therefore, a mismatch between the two measurements as apparent at positions #1, #2, and #3 of FIG. 4B can be taken as indicating the presence of a fracture, particularly once other reasons for the amplitude attenuation such as changes in the formation porosity-derived permeability are excluded using for example permeability logs or other extraneous knowledge. The amount of attenuation depends on the volume of the fracture and may hence be used to estimate the size of it.

In wells drilled into granitic basement formations, or similar formations, the permeability of the rock matrix in the absence of fractures is effectively zero. The Stoneley caliper technique can be therefore applied advantageously to such basement formations.

From the physical difference of the two measurements, it is possible to establish two features for the novel method and apparatus. It is firstly seen as important to reduce the distance between the source of the tube wave and the receiver. Hence, the preferred configuration is to use the transmitter-receiver pairs which are closest. In the case of the Sonic Scanner the two combination of MU and R13 and of ML and R1 have each a distance of 1 ft [30 cm]. Each of these measurements provides the same information and can thus be easily combined to provide an improved signal-to-noise level.

The short-spaced tube or Stoneley wave signal as described above can also be evaluated to detect the location and/or the depth of perforations using for example the theory and methods described in published U.S. Patent Application Publication No. 2007/0104027.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A method of locating a fracture in a borehole, comprising:
generating tube or Stoneley waves in said borehole at a first location;
measuring amplitudes of said waves;
using said measured amplitudes to determine a first cross-sectional area estimate;
using a measurement principle other than tube or Stoneley waves to determine a second effective cross-sectional area estimate at the first location;
determining a presence or absence of a fracture based on a difference between the first cross-sectional area estimate and the second cross-sectional area estimate.

2. The method of claim 1, further comprising generating a continuous log of the first cross-sectional area estimate and the second cross-sectional area estimate along sections of the borehole.

3. The method of claim 1 wherein the frequency of the tube or Stoneley waves are in the range of 0.1 Hz to 20 kHz.

4. The method of claim 1 using one or more monopole source to generate the tube or Stoneley waves.

5. The method of claim 1 using one or more pressure sensors to determine the amplitude of the tube or Stoneley waves.

6. The method of claim 1 wherein the tube or Stoneley waves travel less than 1 m along the borehole after being generated and before being measured.

7. The method of claim 1 wherein the tube or Stoneley waves travel less than 0.5 m along the borehole after being generated and before being measured.

8. The method of claim 1, further comprising:
measuring the amplitudes after the tube or Stoneley waves have travelled less than 1 meter and obtaining an effective cross-sectional area measurement with a longitudinal resolution determined by the less than 1 meter.

9. The method according to claim 1 further comprising generating the tube or Stoneley waves with the closest-spaced transmitter-receiver means of an acoustic logging tool.

10. The method according to claim 9 wherein the transmitter-receiver means is spaced by one foot.

11. The method according to claim 1, wherein using a measurement principle other than tube or Stoneley waves to determine second effective cross-sectional area estimate at the first location comprises either using a mechanical caliper or using an ultrasonic caliper.

\* \* \* \* \*